(12) United States Patent
AlHaffar et al.

(10) Patent No.: US 11,939,720 B2
(45) Date of Patent: Mar. 26, 2024

(54) LAUNDRY FOLDING APPLIANCE AND AUTOMATED METHODS OF OPERATING THE SAME

(71) Applicant: Haier US Appliance Solutions, Inc., Wilmington, DE (US)

(72) Inventors: Nasib AlHaffar, Louisville, KY (US); Abdel Hamad, Louisville, KY (US); Juan Manuel Huerta, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 356 days.

(21) Appl. No.: 17/203,152

(22) Filed: Mar. 16, 2021

(65) Prior Publication Data
US 2022/0298721 A1 Sep. 22, 2022

(51) Int. Cl.
*D06F 89/00* (2006.01)
*G06F 18/214* (2023.01)
*G06T 1/00* (2006.01)
*G06V 20/52* (2022.01)

(52) U.S. Cl.
CPC ............ *D06F 89/00* (2013.01); *G06F 18/214* (2023.01); *G06T 1/0014* (2013.01); *G06V 20/52* (2022.01)

(58) Field of Classification Search
CPC ........ D06F 89/00; G06V 20/52; G06V 20/60; G06F 18/214; G06T 1/0014
See application file for complete search history.

(56) References Cited

U.S. PATENT DOCUMENTS

| | | | |
|---|---|---|---|
| 2,921,726 A * | 1/1960 | Maxwell | D06F 89/023 223/37 |
| 5,934,523 A * | 8/1999 | Willett | D06F 89/02 198/604 |
| 2007/0021283 A1 | 1/2007 | Leifer | |
| 2010/0092677 A1* | 4/2010 | Ozawa | B41J 3/4078 347/102 |
| 2017/0321372 A1 | 11/2017 | Brosky | |
| 2018/0281179 A1* | 10/2018 | Michalakis | B25J 9/1666 |
| 2019/0153661 A1 | 5/2019 | Rozov | |
| 2019/0345664 A1 | 11/2019 | Bringewatt | |
| 2020/0096954 A1 | 3/2020 | Kim | |

FOREIGN PATENT DOCUMENTS

| | | |
|---|---|---|
| CN | 202705756 U | 1/2013 |
| CN | 105342164 A | 2/2016 |
| CN | 103590229 B | 6/2016 |

(Continued)

*Primary Examiner* — Ismael Izaguirre
(74) *Attorney, Agent, or Firm* — Dority & Manning, P.A.

(57) ABSTRACT

A laundry folding appliance includes one or more folding panels mechanically coupled to a cabinet and at least partially defining a folding surface for receiving articles of clothing. An actuating assembly selectively pivots the folding panels to fold the articles of clothing and a camera assembly is positioned in view of the folding surface. A controller obtains one or more images using the camera assembly, identifies the laundry articles positioned on the folding surface by analyzing the one or more images using a laundry identification model, determines a folding protocol for folding the laundry article, and operates the actuating assembly to fold the laundry article in accordance with the folding protocol.

20 Claims, 7 Drawing Sheets

(56) References Cited

FOREIGN PATENT DOCUMENTS

| | | | |
|---|---|---|---|
| CN | 105926257 A | 9/2016 | |
| CN | 109677820 A | 4/2019 | |
| CN | 111005198 A | 4/2020 | |
| KR | 20120127406 A * | 11/2012 | |
| WO | WO2019242592 A1 | 12/2019 | |
| WO | WO2019242595 A1 | 12/2019 | |
| WO | WO-2020003127 A1 * | 1/2020 | ............ B25J 13/086 |
| WO | WO-2020067413 A1 * | 4/2020 | |

* cited by examiner

LAUNDRY FOLDING APPLIANCE AND AUTOMATED METHODS OF OPERATING THE SAME

FIELD OF THE INVENTION

The present subject matter relates generally to laundry folding appliances, and more particularly to folding appliances using a camera assembly for automated folding of laundry articles.

BACKGROUND OF THE INVENTION

Laundry appliances are commonly used to wash and dry laundry items, towels, or other clothing items. In this regard, washing machine appliances typically receive and wash a load of clothes or other articles by agitating the load in a wash basket containing water and/or detergent and extracting wash fluid during a high-speed spin cycle. A dryer appliance subsequently removes additional moisture from the clothes, e.g., by tumbling the load within another basket while circulating heated air through the basket.

Notably, after the load of clothes or other laundry articles have been dried they must be removed from the wash basket and either hung on a hanger or carefully folded to prevent the formation of wrinkles and creases in the clothes that commonly results in heated loads as they settle. As a result, users of the laundry appliance must typically be close to the dryer appliance and ready to intervene as soon as the drying cycle is complete. Each laundry item must be separately removed from the load and folded, resulting in undesirable consumer interaction. This laundry folding process and other post-dry laundry care is typically viewed negatively by a consumer, as it is a relatively time-consuming, monotonous, and unfulfilling process.

Accordingly, an improved clothing care system that reduces or simplifies user interaction is desired. More specifically, a system or device for performing tasks typically performed by a user of a laundry system after a drying cycle to minimize user effort or interaction would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a laundry folding appliance is provided including a cabinet, one or more folding panels mechanically coupled to the cabinet and at least partially defining a folding surface, an actuating assembly for selectively folding the one or more folding panels, a camera assembly positioned in view of the folding surface, and a controller operably coupled to the actuating assembly and the camera assembly. The controller is configured to obtain one or more images using the camera assembly, identify a laundry article positioned on the folding surface by analyzing the one or more images using a laundry identification model, determine a folding protocol for folding the laundry article, and operate the actuating assembly to fold the laundry article in accordance with the folding protocol.

In another exemplary embodiment, a method of operating a laundry folding appliance is provided. The laundry folding appliance includes one or more folding panels mechanically coupled to a cabinet and at least partially defining a folding surface, an actuating assembly for selectively folding the one or more folding panels, and a camera assembly positioned in view of the folding surface. The method includes obtaining one or more images using the camera assembly, identifying a laundry article positioned on the folding surface by analyzing the one or more images using a laundry identification model, determining a folding protocol for folding the laundry article, and operating the actuating assembly to fold the laundry article in accordance with the folding protocol.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
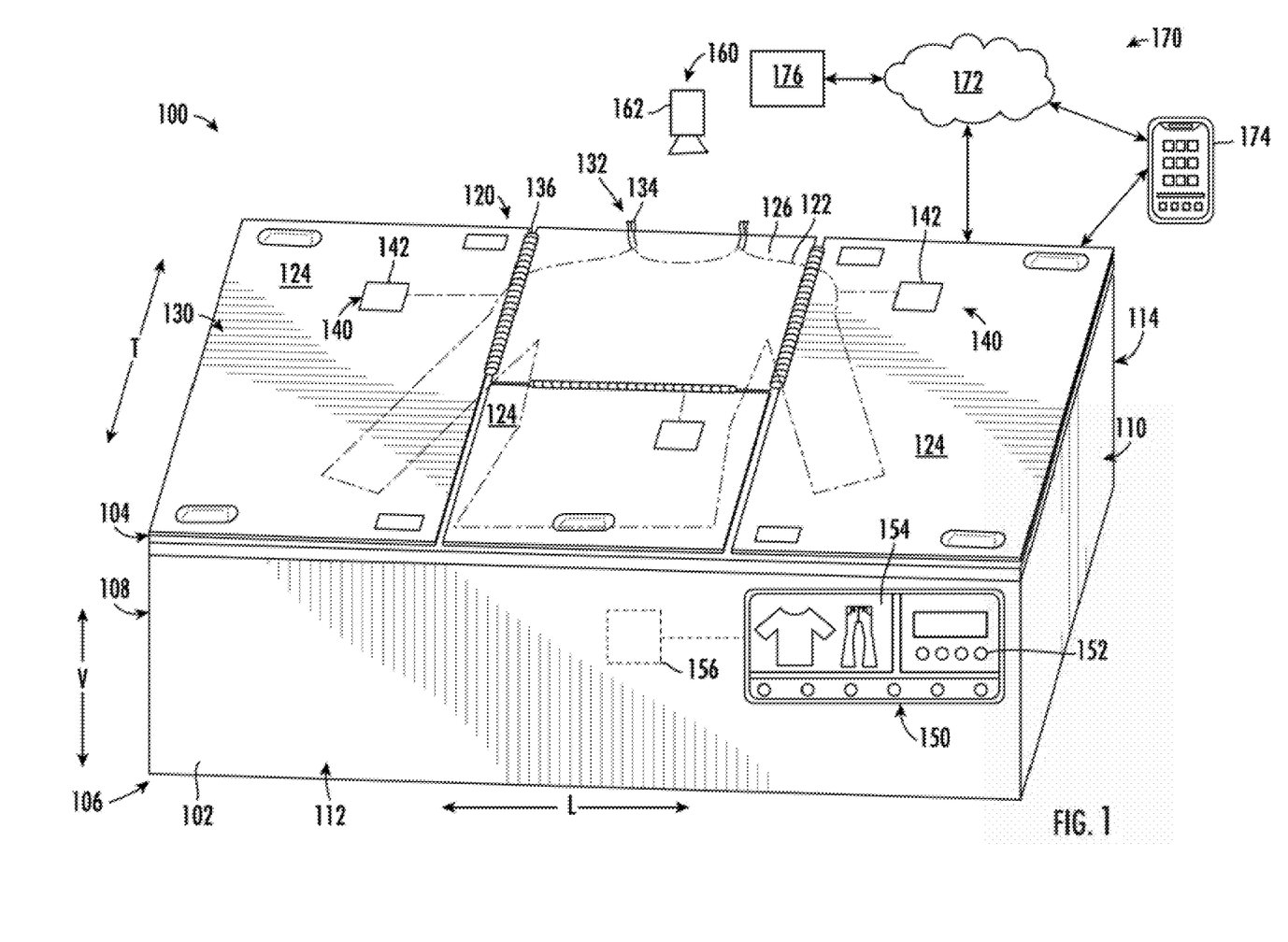
FIG. 1 provides a perspective view of a laundry folding appliance including a plurality of folding panels in a lowered position according to an exemplary embodiment of the present subject matter.
Figure 2:
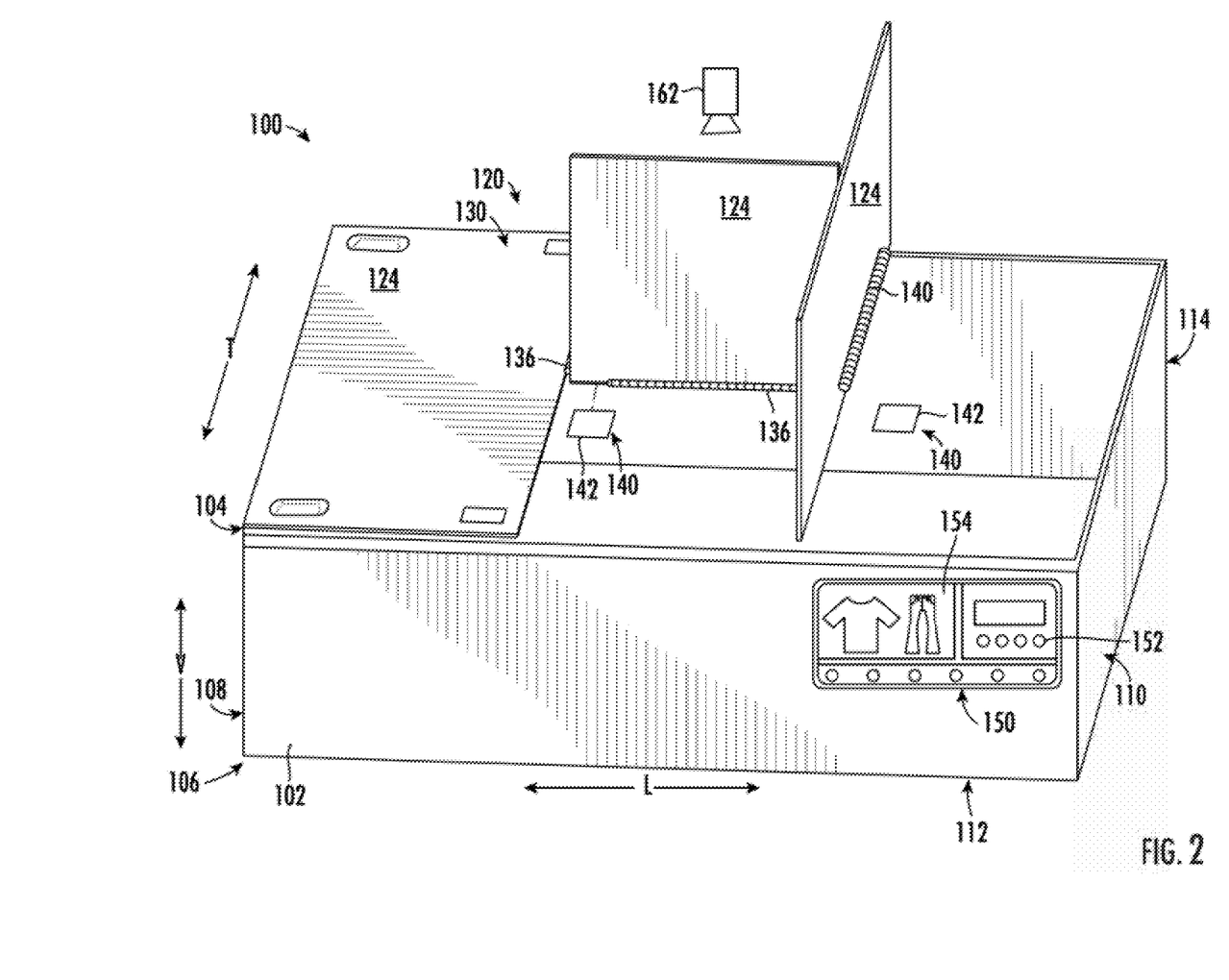
FIG. 2 provides a perspective view of the exemplary laundry folding appliance of FIG. 1 with two of the plurality of folding panels in a raised position according to an exemplary embodiment of the present subject matter.
Figure 3:
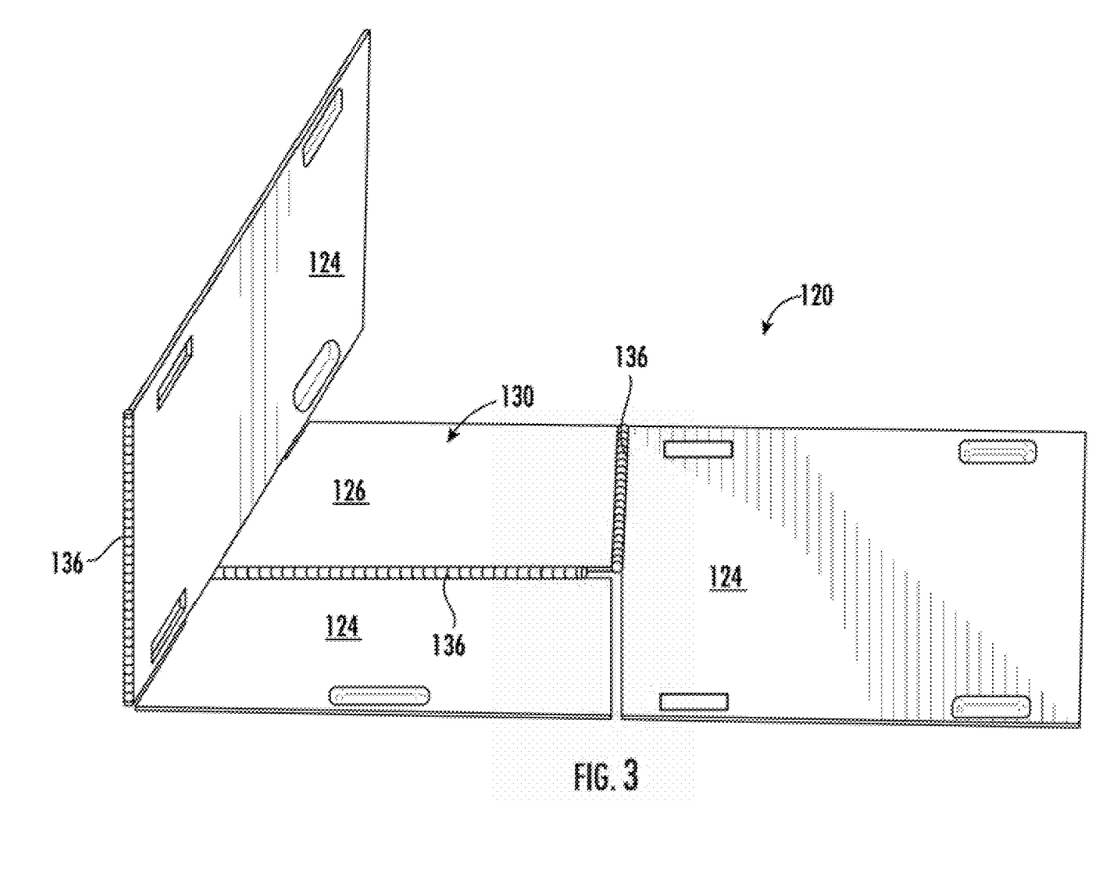
FIG. 3 provides a schematic view the plurality of folding panels in a first configuration according to an exemplary embodiment of the present subject matter.
Figure 4:
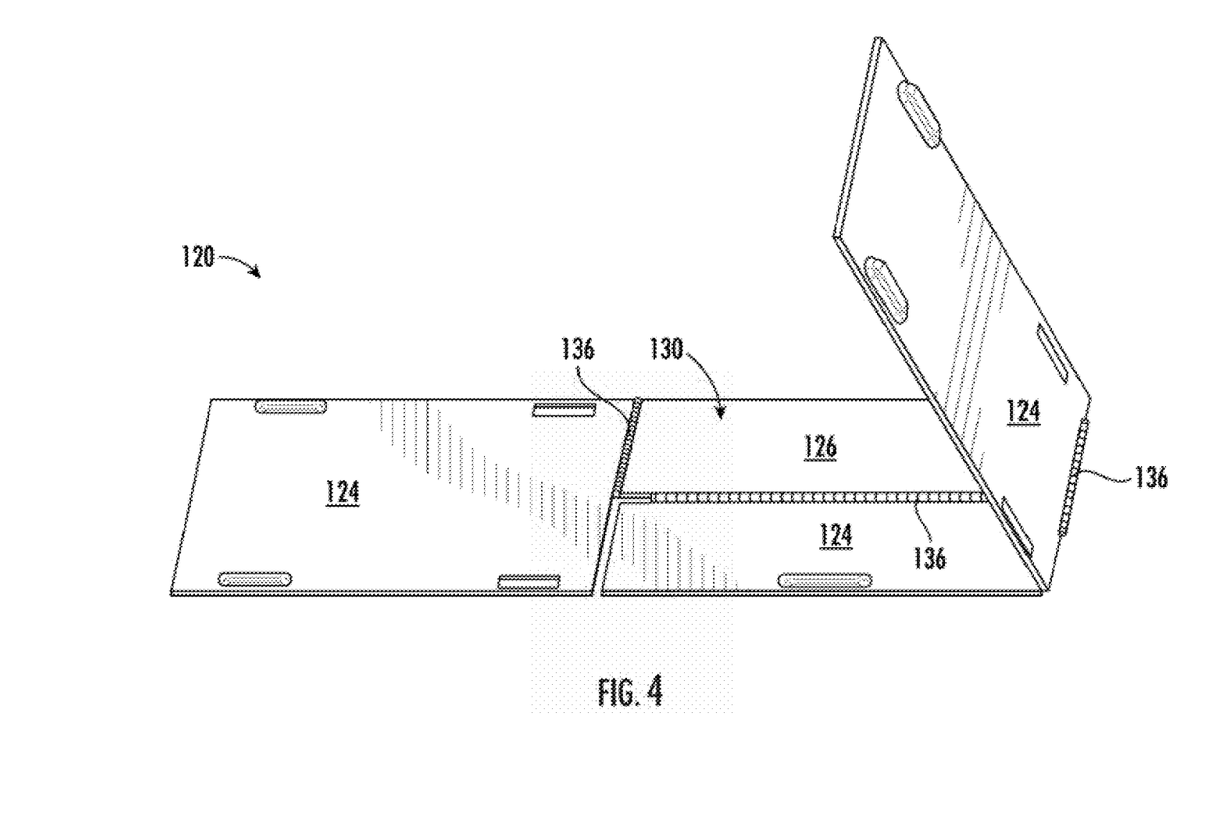
FIG. 4 provides a schematic view the plurality of folding panels in a second configuration according to an exemplary embodiment of the present subject matter.
Figure 5:
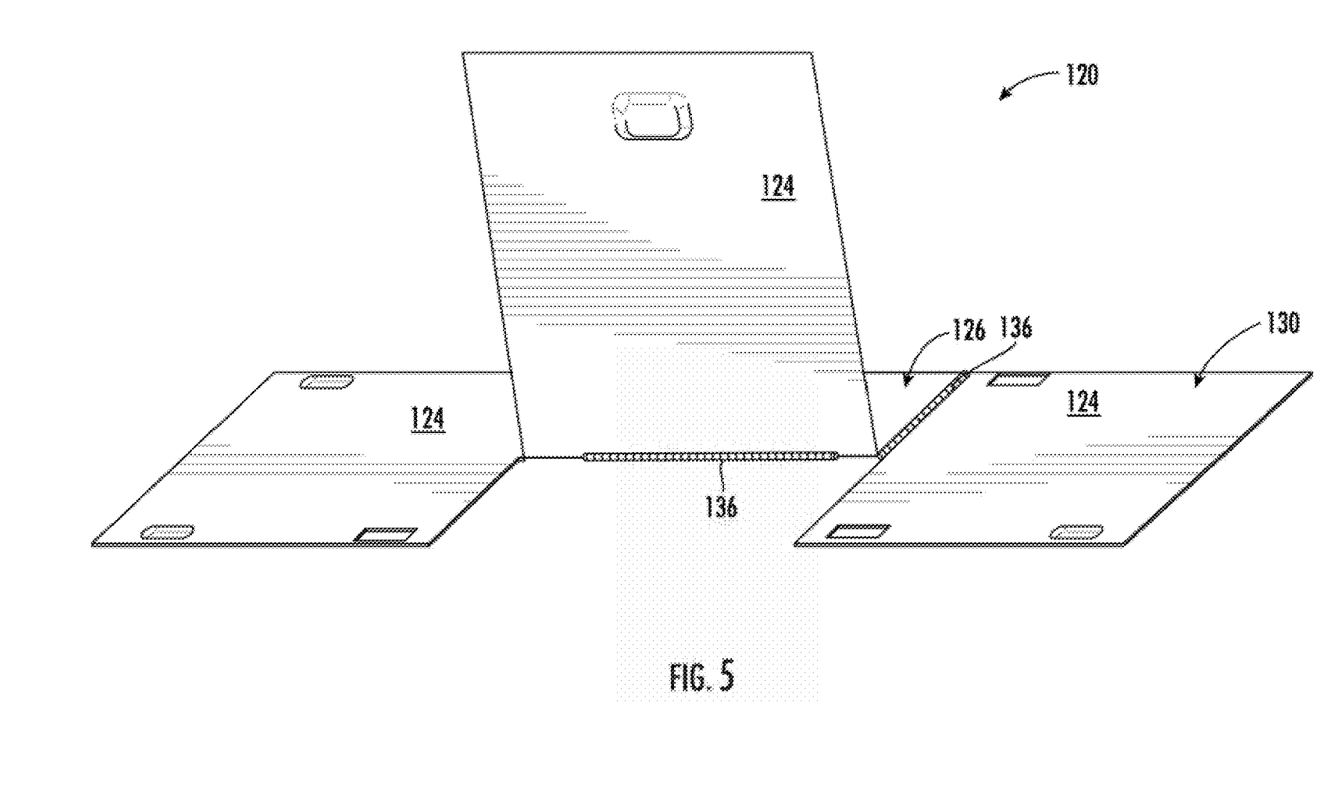
FIG. 5 provides a schematic view the plurality of folding panels in a third configuration according to an exemplary embodiment of the present subject matter.

Referring now to the figures, an exemplary laundry folding appliance 100 that may be used to implement aspects of the present subject matter will be described. Specifically, FIG. 1 is a perspective view of laundry folding appliance 100 in a relaxed state prior to implementing a folding process. FIG. 2 provides a perspective view of laundry folding appliance 100 with some of the folding panels in an extended or raised position. FIGS. 3 through 5 provides perspective views of folding panels of laundry folding appliance 100 in various positions. Although an exemplary configuration of laundry folding appliance 100 is described herein to facilitate discussion of the present subject matter, it should be appreciated that variations and modifications may be made to laundry folding appliance 100 while remaining within the scope of the present subject matter.

As illustrated, laundry folding appliance 100 generally defines a vertical direction V, a lateral direction L, and a transverse direction T, each of which is mutually perpendicular, such that an orthogonal coordinate system is generally defined. Laundry folding appliance 100 includes a support structure, housing, or cabinet 102 that extends between a top 104 and a bottom 106 along the vertical direction V, between a left side 108 and a right side 110 along the lateral direction L, and between a front 112 and a rear 114 along the transverse direction T. As will be described in more detail below, cabinet 102 is generally configured for containing and/or supporting various working components of laundry folding appliance 100.

Specifically, as illustrated in the figures, laundry folding appliance 100 generally includes a folding system 120 that is supported by cabinet 102 and is configured for folding articles of clothing, garments, or other laundry articles (e.g., as identified generally in FIG. 1 by reference numeral 122). In this regard, for example, laundry folding appliance 100 may be positioned within a laundry room so that a user may take articles of clothing directly from a dryer appliance and position them in the desired orientation on folding system 120. As will be explained in more detail below, folding system 120 may be programmed to perform a sequence of folding actions in order to properly fold the laundry article 122 as desired prior to storing the laundry articles 122 in a closet, drawer, or other storage location.

Specifically, according to the illustrated embodiment, folding system 120 includes one or more folding panels 124 that are mechanically coupled to cabinet 102 or another suitable support structure extending therefrom. Folding panels 124 are generally movable relative to cabinet 102, e.g., in order to facilitate a folding process. In addition, folding system 120 may include one or more fixed panels 126 as needed to facilitate a folding process. For example, according to the illustrated embodiment, fixed panel 126 is positioned proximate a rear 114 of cabinet 102 roughly at a midpoint between left side 108 and right side 110. In this manner, fixed panel 126 is generally a rigid, fixed surface upon which folding panels 124 may manipulate laundry articles 122 during a folding process.

Notably, when folding panels 124 are in the lowered or retracted position, they may at least partially define a folding surface 130 that is generally configured for receiving laundry articles 122. More specifically, according to the illustrated embodiment, folding panels 124 may be seated on top 104 of cabinet 102 when in the lowered position. Thus, folding panels 124 and fixed panel 126 may define a large horizontal folding surface 130 upon which laundry articles 122 may be placed. According to exemplary embodiments the present subject matter, one or more instructional patterns, positioning features, or clothing guides may be printed or integrated onto folding surface 130, e.g., to instruct the user as to the proper initial position of a laundry articles 122 to be folded. For example, as illustrated in FIG. 1, laundry article 122 may be a shirt that is oriented with its collar positioned that the rear of fixed panel 126.

According to the illustrated embodiment, laundry folding appliance 100 may further include an attachment mechanism 132 for securing laundry articles 122 onto folding surface 130 in the desired orientation. Specifically, according to the illustrated embodiment, attachment mechanism 132 includes a plurality of spring-loaded mechanical clips 134. However, it should be appreciated that any suitable mechanism for temporarily securing laundry articles 122 to folding surface 130 may be used while remaining within the scope of the present subject matter. In addition, it should be appreciated that the attachment mechanisms 132 may vary depending on the type of garment being folded.

In order to facilitate the folding process, folding panels 124 may be manipulated relative to fixed panel 126, e.g., such that portions of laundry article 122 are folded onto fixed panel 126 in a desired sequence to facilitate proper folding. According to the illustrated embodiment, each folding panel 124 is mechanically coupled on a single side to fixed panel 126 by a mechanical hinge 136. In this manner, each folding panel 124 may pivot relative to fixed panel 126 between a lowered position (e.g., as shown in FIG. 1) in a raised position (e.g., as shown in FIG. 2 for the lower and right-side folding panels 124).

Laundry folding appliance 100 may further include an actuating assembly 140 that is generally configured for selectively and independently folding the folding panels 124. Specifically, according to the illustrated embodiment, actuating assembly 140 includes a plurality of drive motors 142 that are configured for moving folding panels 124. In this regard, each of the plurality of drive motors 142 is mechanically coupled to one of the folding panels 124 for independently moving each folding panel 124 between the lowered position in the raised position. More specifically, according to the illustrated embodiment, drive motors 142 are directly mechanically coupled to hinges 136 or otherwise integrated into hinges 136.

It should be appreciated that the configuration of folding system 120 described herein is only exemplary and is not intended to limit the scope of the present subject matter. For example, folding panels 124 are described as being pivotally attached to fixed panel 126 through a mechanical hinge 136.

However, according to alternative embodiments, folding panels 124 may be separately supported by a support structure or mounted directly to cabinet and may be actuated in any other suitable manner or sequence. For example, folding panels 124 could alternatively be supported by one or more mechanical actuators, e.g., such as a hydraulic piston or other linear actuator. These linear actuators may be selectively extended to position folding panels 124 in any suitable orientation to facilitate a folding process.

Laundry folding appliance 100 may further include a control panel 150 including a plurality of input selectors 152 for facilitating user interaction. According to the illustrated embodiment, control panel 150 is positioned on a front 112 of cabinet 102. Control panel 150 and input selectors 152 collectively form a user interface input for operator selection of machine cycles and features. For example, in one embodiment, a display 154 indicates selected features, an image of the selected laundry article 122, and/or other items of interest to machine users. Operation of laundry folding appliance 100 is controlled by a controller or processing device 156 (FIG. 1) that is operatively coupled to control panel 150 for user manipulation, e.g., to select the garment type or folding preferences. In response to user manipulation of control panel 150, controller 156 operates the various components of laundry folding appliance 100 to execute selected machine cycles and features.

Controller 156 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of laundry folding appliance 100 may be in communication with controller 156 via one or more signal lines or shared communication busses.

Referring now specifically to FIG. 1, laundry folding appliance 100 may further include a camera assembly 160 that is generally positioned and configured for obtaining images of folding surface 130 and/or laundry articles 122 positioned thereon. According to the illustrated embodiment, camera assembly 160 includes a single camera 162 that is mounted above folding surface 130 along the vertical direction V and in view of folding surface 130. However, it should be appreciated that according to alternative embodiments, camera assembly 160 may include any suitable number, type, and configuration of cameras or systems of imaging devices for obtaining images of the laundry articles 122, e.g., for obtaining multiple views of laundry article 122 to facilitate an improved folding process as described below. According to exemplary embodiments, camera assembly 160 may further include one or more lights (not shown) that are configured for selectively illuminating folding surface 130 and/or the laundry articles 122 positioned thereon prior to image capture.

Notably, controller 156 of laundry folding appliance 100 (or any other suitable dedicated controller) may be communicatively coupled to camera assembly 160, associated lights, and other components of laundry folding appliance 100. As explained in more detail below, controller 156 may be programmed or configured for obtaining images using camera assembly 160, e.g., in order to identify the type of laundry article 122 being folded. Controller 156 may further be programmed or configured to determine the proper folding sequence for the identified garment and implementing the folding sequence using actuating assembly 140.

Referring still to FIG. 1, a schematic diagram of an external communication system 170 will be described according to an exemplary embodiment of the present subject matter. In general, external communication system 170 is configured for permitting interaction, data transfer, and other communications with laundry folding appliance 100. For example, this communication may be used to provide and receive operating parameters, fold cycle settings, performance characteristics, user preferences, user notifications, or any other suitable information for improved performance of laundry folding appliance 100.

External communication system 170 permits controller 156 of laundry folding appliance 100 to communicate with external devices either directly or through a network 172. For example, a consumer may use a consumer device 174 to communicate directly with laundry folding appliance 100. For example, consumer devices 174 may be in direct or indirect communication with laundry folding appliance 100, e.g., directly through a local area network (LAN), Wi-Fi, Bluetooth, Zigbee, etc. or indirectly through network 172. In general, consumer device 174 may be any suitable device for providing and/or receiving communications or commands from a user. In this regard, consumer device 174 may include, for example, a personal phone, a tablet, a laptop computer, or another mobile device.

In addition, a remote server 176 may be in communication with laundry folding appliance 100 and/or consumer device 174 through network 172. In this regard, for example, remote server 176 may be a cloud-based server 176, and is thus located at a distant location, such as in a separate state, country, etc. In general, communication between the remote server 176 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In general, network 172 can be any type of communication network. For example, network 172 can include one or more of a wireless network, a wired network, a personal area network, a local area network, a wide area network, the internet, a cellular network, etc. According to an exemplary embodiment, consumer device 174 may communicate with a remote server 176 over network 172, such as the internet, to provide user inputs, transfer operating parameters or performance characteristics, receive user notifications or instructions, etc. In addition, consumer device 174 and remote server 176 may communicate with laundry folding appliance 100 to communicate similar information.

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more laundry folding appliances, other communication protocols and steps may be implemented, etc. These variations and modifications are contemplated as within the scope of the present subject matter.

Figure 6:
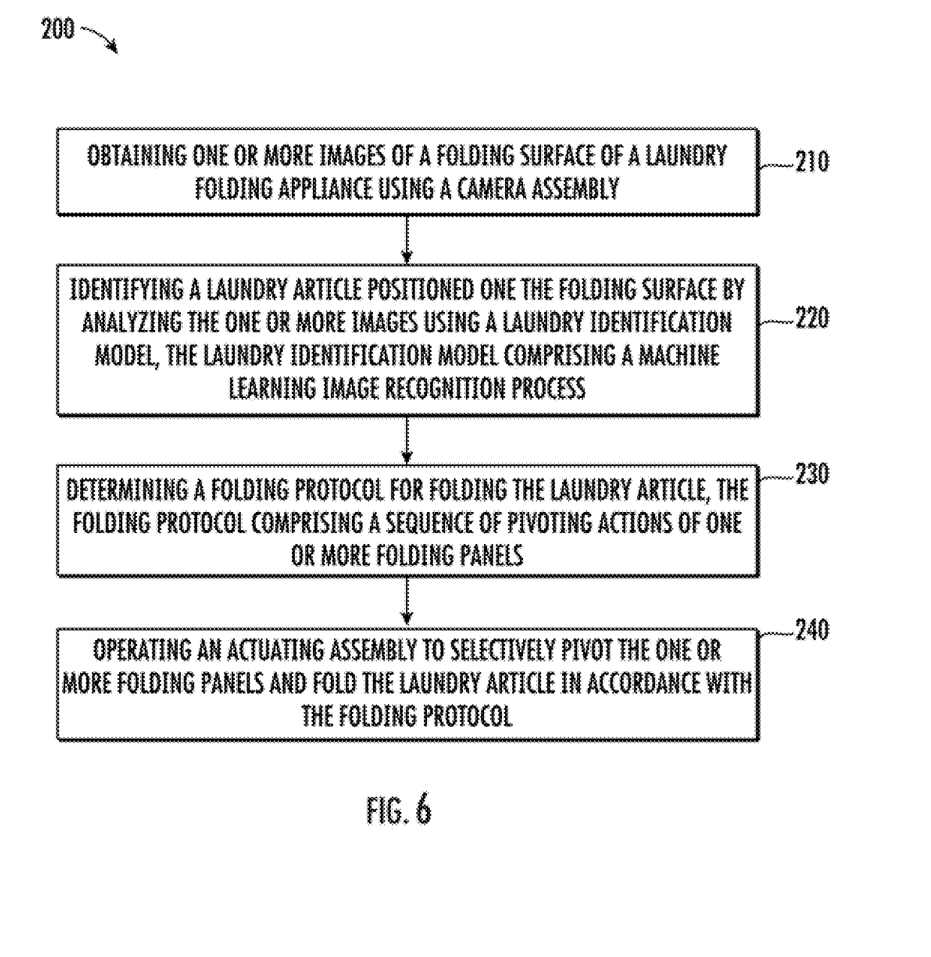
FIG. 6 illustrates a method for operating a laundry folding appliance to fold a laundry article according to an exemplary embodiment of the present subject matter.

Now that the construction of laundry folding appliance 100 and the configuration of controller 156 according to exemplary embodiments have been presented, an exemplary method 200 of operating a laundry folding appliance will be described. Although the discussion below refers to the exemplary method 200 of operating a laundry folding appliance 100, one skilled in the art will appreciate that the exemplary method 200 is applicable to the operation of a variety of other laundry folding appliances. In exemplary embodiments, the various method steps as disclosed herein may be performed by controller 156 or a separate, dedicated controller.

Referring now to FIG. 6, method 200 includes, at step 210, obtaining one or more images of a folding surface of a laundry folding appliance using a camera assembly. For example, continuing the example from above, camera assembly 160 may capture images of folding surface 130 and/or laundry articles 122 positioned thereon prior to a folding process. As explained in more detail below, these images may be used to identify the laundry article 122 being folded to facilitate the determination of a proper folding sequence for those particular laundry articles 122. Step 210 may include obtaining a series of frames, a video, a still image from the video clip, or otherwise obtaining a still representation or photograph. It should be appreciated that the images obtained by camera assembly 160 may vary in number, frequency, angle, resolution, detail, etc. in order to improve the clarity of the laundry article 122. In addition, according to exemplary embodiments, controller 156 may be configured for illuminating the folding surface 130 with a light source just prior to obtaining images.

Referring still to FIG. 6, method 200 may include, at step 220, identifying a laundry article positioned on the folding the surface by analyzing the one or more images using a laundry identification model. As used herein, the term "laundry identification model" is generally intended to refer to any computer software, algorithm, or other processor instructions that are intended to identify or determine the type or identity of laundry article 122 positioned on folding surface 130. Although an exemplary laundry identification model is described herein, it should be appreciated that any suitable image processing or recognition method may be used to analyze the images obtained at step 210 and facilitate identification of laundry article 122. In addition, it should be appreciated that this image analysis or processing may be performed locally (e.g., by controller 156) or remotely (e.g., by a remote server).

According to exemplary embodiments, the laundry identification model includes or implements a machine learning image recognition process for analyzing the images obtained at step 210 in order to identify the laundry article 122. In this regard, step 220 of analyzing the one or more images may include analyzing the image(s) of the folding surface 130 using a neural network classification module and/or a machine learning image recognition process. In this regard, for example, controller 156 may be programmed to implement the machine learning image recognition process that includes a neural network trained with a plurality of images of different laundry articles. By analyzing the image(s) obtained at step 210 using this machine learning image recognition process, controller 156 may identify laundry article 122 that is positioned on folding surface 130, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken of folding surface 130 and/or laundry articles 122. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 160 and controller 156 may be programmed to implement such analysis and identify laundry articles 122.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment. In this regard, a "region proposal" may be regions in an image that could belong to a particular object, such as a particular article of clothing. A convolutional neural network is then used to compute features from the regions proposals and the extracted features will then be used to determine a classification for each particular region. According to exemplary embodiments, a fully convolutional neural network ("FCN") may be used.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 220 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image to identify laundry article 122 positioned on folding surface 130. In addition, a K-means algorithm, expectation maximization, or other clustering techniques may be used. Other image recognition processes are possible and within the scope of the present subject matter.

It should be appreciated that any other suitable image recognition process may be used while remaining within the scope of the present subject matter. For example, step 220 may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output.

Other suitable image recognition processes, neural network processes, artificial intelligence ("AI") analysis techniques, and combinations of the above described or other known methods may be used while remaining within the scope of the present subject matter. For example, according to still other exemplary embodiments, the machine learning image recognition process comprises at least one key point detection or feature extraction. In this regard, the trained model may extract relevant features, such as a classification of the garment type, an image segmentation for shape, and/or key point detection to understand relevant corners or portions of laundry article 122. Notably, all this information may be obtained and stored for use in the clothing recommendation model, as will be described below.

Step 230 may include determining a folding protocol for folding the laundry article. In general, the term "folding protocol" and the like is generally intended to refer to any sequence of actions by folding system 120 that are intended to facilitate folding of laundry article 122. For example, the folding protocol may generally include a sequence of pivoting actions to be implemented by actuating assembly 140 such that folding panels 124 are folded or articulated in a manner to facilitate folding process. This folding protocol may include an identification of folding panels 124 to be pivoted, the sequence of pivoting actions, the speed at which pivoting occurs, delay periods between the sequence of actions, or any other parameters to be implemented using actuating assembly 140 during a folding process.

For example, according to an exemplary embodiment of the present subject matter the folding protocol for a pair of slacks or pants might be actuating a left panel, e.g., folding panel 124 positioned proximate left side 108 of cabinet 102, and then subsequently actuating a right panel, e.g., the folding panel 124 positioned proximate right side 110 of cabinet 102. Similarly, the folding protocol for a shirt or blouse might be actuating the left panel, actuating the right panel, and then actuating a bottom panel, e.g., the folding panel 124 positioned proximate front 112 of cabinet 102. It should be appreciated that these folding protocols are simplified in order to facilitate the present discussion. However, according to alternative embodiments, folding system 120 may include any suitable number, type, and position of folding panels 124 that may be actuated in any suitable sequence to facilitate the folding of any laundry article 122.

FIGS. 3 through 5 illustrate an exemplary sequence of folding panel manipulations to fold a garment, such as a shirt or blouse. First, as shown in FIG. 3, the left side folding panel (i.e., the folding panel 124 proximate left side 108 of cabinet 102) is pivoted and then retracted. Next, as shown in FIG. 4, the right side folding panel (i.e., the folding panel 124 proximate right side 110 of cabinet 102) is pivoted and then retracted. For example, these actions may fold the arms and shoulders of the shirt over onto the main body. Finally, as shown in FIG. 5, the bottom side folding panel (i.e., the folding panel 124 proximate bottom 106 of cabinet 102) is pivoted and then retracted. This folds the waist portion of the blouse up toward the collar. It should be appreciated that this folding sequence is only exemplary and is not intended to limit the scope of the present subject matter in any manner.

It should be appreciated that the folding protocol may be obtained or determined by controller 156 in any suitable manner. For example, according to an exemplary embodiment, controller 156 may be preprogrammed with common laundry articles 122 or garment types along with their preferred folding protocol. According to still other embodiments, a user may select your input the desired folding protocol, e.g., via control panel 150 or using a software application on a remote device 174. Step 240 of method 200 may include operating and actuating assembly to selectively pivot the one or more folding panels to fold the laundry article in accordance with the folding protocol. In this regard, once the identity of the laundry article 122 is determined and an associated or preferred folding protocol for that particular laundry article is determined, step 240 may include operating actuating assembly 140 to manipulate folding panels 124 to fold laundry article 122.

Notably, using the machine learning image recognition process to identify laundry articles 122 positioned on folding surface 130 may facilitate an improved inventory system convenient for a user of laundry folding appliance 100. Specifically, referring now to FIG. 7 an exemplary method of operating a laundry folding appliance to populate a closet inventory list and/or to make clothing recommendations to a user will be provided. Although the discussion below refers to the exemplary method 300 of operating a laundry folding appliance 100, one skilled in the art will appreciate that the exemplary method 300 is applicable to the operation of a variety of other laundry folding appliances. In exemplary embodiments, the various method steps as disclosed herein may be performed by controller 156 or a separate, dedicated controller.

Figure 7:
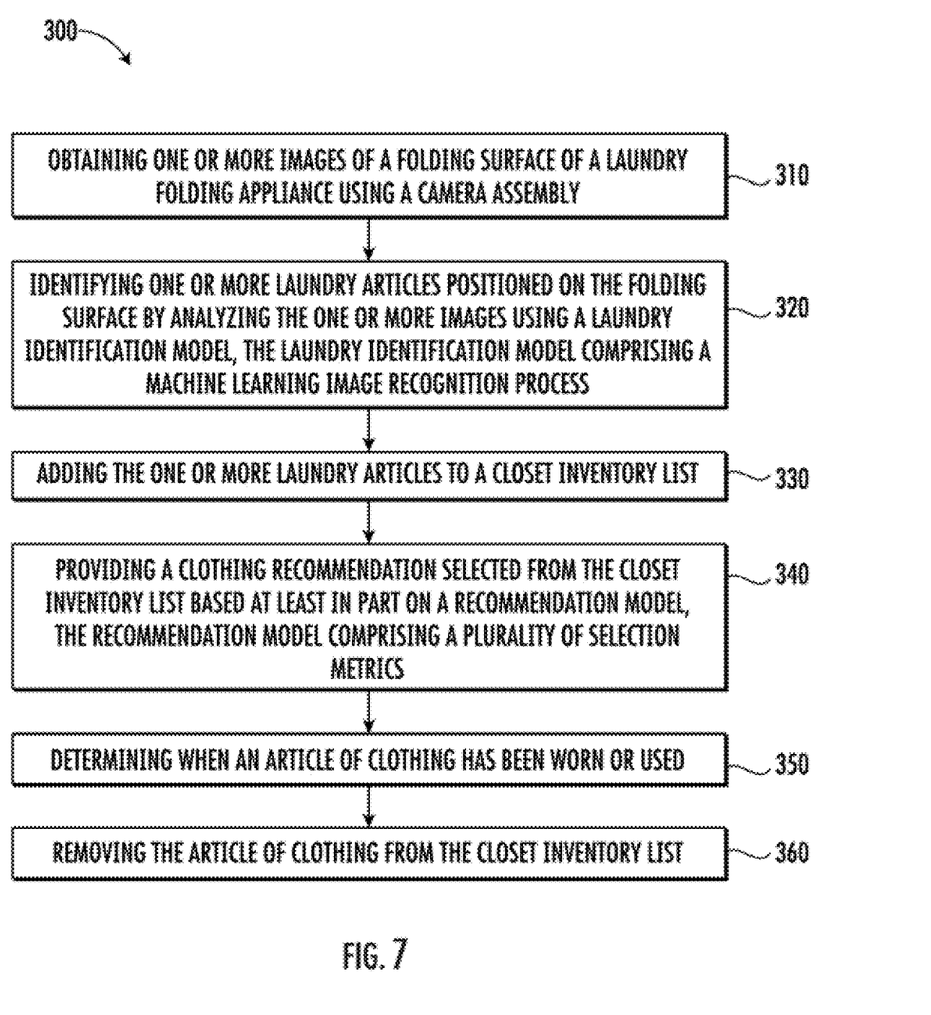
FIG. 7 illustrates a method for operating a laundry folding appliance to populate a closet inventory list and make a clothing recommendation according to an exemplary embodiment of the present subject matter.

As shown in FIG. 7, method 300 may include, at step 310, obtaining one or more images of a folding surface of a laundry appliance using a camera assembly. In addition, step 320 may include identifying one or more laundry articles positioned on the folding surface by analyzing the one or more images using a laundry identification model. Notably, steps 310 and 320 may be the same or similar to steps 210 and 220 from method 200. Therefore, details regarding these steps will not be repeated here for brevity.

Step 330 may include adding the one or more laundry articles to a closet inventory list. In this regard, for example, the laundry articles identified at step 320 may be added to a list that is stored on controller 156 or at any other suitable location that is generally indicative of the articles of clothing available to a user that that particular time. In this regard, for example, when a user puts a laundry article 122 on folding surface 130 to facilitate a folding process, it may be presumed that the user takes the folded laundry article 122 and places it in their closet or other clothes storage area for subsequent use. Thus, this article may be added to their "virtual closet" and may be used for subsequent clothing recommendations, as described in more detail below.

Step 340 includes providing a clothing recommendation selected from the closet inventory list and based at least in part on a recommendation model. As used herein, the term "recommendation model" is generally intended to refer to any software, algorithm, or processor instructions that are intended to make decisions on which articles of clothing should be worn, which outfit combinations are desirable, or otherwise generate clothing recommendations.

According to exemplary embodiments, the recommendation model generates the clothing recommendation based on the closet inventory list and at least one of a plurality of selection metrics. These selection metrics may be programmed by the user, set by the manufacturer, or determined in any other suitable manner. These metrics may also be manipulated as desired for a particular user, e.g., according to preference or historical outfit selections. According to exemplary embodiment, the plurality of selection metrics may include a list of one or more clothing types, a list of favorite clothing items, weather data, calendar data, or data regarding historical preferences and outfit combinations.

For example, controller 156 of laundry folding appliance 100 may obtain weather data from the National Weather Service or the Internet and may identify days when rain is likely. As a result, when a user requests a clothing recommendation on those days, controller 156 may recommend waterproof outerwear. By contrast, if a clothing recommendation is requested when it is hot outside, the recommendation may be to wear short sleeves and/or shorts. In addition, clothing recommendations may be based on calendar data. In this regard, the clothing recommendation may be based on the month and common colors or fabric types worn during that month. In addition, or alternatively, the clothing recommendations may be based at least in part on a user's personal calendar, e.g., based on scheduled events. For example, if a business meeting is scheduled, the clothing recommendation may include business attire.

A user may select favorite items or preferred items that will be recommended more often than others and may manipulate the selection protocol in any other suitable manner. For example, a user may program or download selection metrics which include fashion algorithms or ideal outfit combinations. Thus, the user may select one item of clothing and controller 156 may recommend a compatible or complementary garment.

In order to generate the recommendation, controller 156 may first filter out all unavailable clothing, e.g., clothing that is unavailable because it is dirty, has not been folded, or is otherwise incompatible with the day or event (e.g., due to weather or calendar data). All possible clothing combinations may be formed from a list of all available laundry items. Each combination may be scored based on a weighted value of user habits, style match, colors, and other relevant features. These scores can form a recommendation matrix and can be processed or otherwise utilized along with a contextual bandits approach or any other suitable reinforcement learning methods. According to still other embodiments, a form of dimensionality reduction and/or a type of decision tree may be applied. Notably, various technologies or techniques may be used by the recommendation model to generate these recommendations. For example, according to exemplary embodiments, the recommendation model generates recommendations using at least one a contextual bandits approach, few shot learning, decision trees, or any other suitable reinforcement learning methods.

Moreover, it should be appreciated that laundry folding appliance 100 may communicate with a user in any suitable manner. For example, according to exemplary embodiments, clothing recommendations may be made through control panel 150 when desired or demanded by the user. According to still other embodiments, a user may interact laundry folding appliance 100 using remote device 174. In this regard, a user may pick up their smart phone, open a software application, and receive a clothing recommendation for the day.

Notably, method 300 may further include steps for removing laundry articles that have been used, worn, or otherwise removed from availability to a user. In this regard, for example, step 350 may include determining when an article of clothing has been worn, used, or otherwise removed from the closet inventory list. Step 360 may include removing the article of clothing from the closet inventory list. This determination of when an article of clothing has been used may be made in any suitable manner. For example, when a user accepts a clothing recommendation, the clothing included in that recommendation may be automatically removed from the closet inventory list. Alternatively, a camera system or imaging system may monitor the closet or clothes storage area to determine when an item has been removed and may update the closet inventory list accordingly.

FIGS. 6 and 7 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using laundry folding appliance 100 as an example, it should be appreciated that this method may be applied to the operation of any suitable laundry folding appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry folding appliance comprising:
   a cabinet;
   a fixed plate attached to the cabinet
   one or more folding panels rotatably coupled to the fixed plate by one or more hinge mechanisms, the fixed plate and the one or more folding panels at least partially defining a flat folding surface;
   an actuating assembly for selectively folding the one or more folding panels;
   a camera assembly positioned in view of the flat folding surface; and
   a controller operably coupled to the actuating assembly and the camera assembly, the controller being configured to:
      obtain one or more images using the camera assembly;
      identify a laundry article positioned on the flat folding surface by analyzing the one or more images using a laundry identification model;
      determine a folding protocol for folding the laundry article; and
      operate the actuating assembly to fold the laundry article in accordance with the folding protocol.

2. The laundry folding appliance of claim 1, wherein the actuating assembly comprises:
   a plurality of drive motors, each of the plurality of drive motors being mechanically coupled to one of the one or more folding panels for independently moving the one or more folding panels between a lowered position and a raised position.

3. The laundry folding appliance of claim 1, wherein the laundry identification model analyzes the one or more images using a machine learning image recognition process to identify the laundry article.

4. The laundry folding appliance of claim 3, wherein the machine learning image recognition process comprises at least one of a convolution neural network ("CNN"), a region-based convolution neural network ("R-CNN"), a deep belief network ("DBN"), or a deep neural network ("DNN") image recognition process.

5. The laundry folding appliance of claim 3, wherein the machine learning image recognition process comprises at least one of image classification, image segmentation, key point detection, or feature extraction.

6. The laundry folding appliance of claim 1, wherein the folding protocol comprises a sequence of pivoting actions of the one or more folding panels as actuated by the actuating assembly.

7. The laundry folding appliance of claim 6, wherein the folding protocol for pants comprises:
   actuating a left panel of the one or more folding panels; and
   actuating a right panel of the one or more folding panels.

8. The laundry folding appliance of claim 6, wherein the folding protocol for shirts comprises:
   actuating a left panel of the one or more folding panels;
   actuating a right panel of the one or more folding panels; and
   actuating a bottom panel of the one or more folding panels.

9. The laundry folding appliance of claim 1, further comprising:
   an attachment mechanism for attaching the laundry article to the flat folding surface.

10. The laundry folding appliance of claim 9, wherein the attachment mechanism is a mechanical clip.

11. The laundry folding appliance of claim 1, wherein the camera assembly comprises a camera mounted above the flat folding surface along a vertical direction.

12. The laundry folding appliance of claim 1, further comprising:
   a user interface panel, wherein the folding protocol is selected through the user interface panel.

13. A method of operating a laundry folding appliance, the laundry folding appliance comprising one or more folding panels rotatably coupled to a fixed plate by one or more hinge mechanisms, the fixed plate and the one or more folding panels at least partially defining a flat folding surface, an actuating assembly for selectively folding the one or more folding panels, and a camera assembly positioned in view of the flat folding surface, the method comprising:
   obtaining one or more images using the camera assembly;
   identifying a laundry article positioned on the flat folding surface by analyzing the one or more images using a laundry identification model;
   determining a folding protocol for folding the laundry article; and
   operating the actuating assembly to fold the laundry article in accordance with the folding protocol.

14. The method of claim 13, wherein the laundry identification model analyzes the one or more images using a machine learning image recognition process to identify the laundry article.

15. The method of claim 14, wherein the machine learning image recognition process comprises at least one of a convolution neural network ("CNN"), a region-based convolution neural network ("R-CNN"), a deep belief network ("DBN"), or a deep neural network ("DNN") image recognition process.

16. The method of claim 14, wherein the machine learning image recognition process comprises at least one of image classification, image segmentation, key point detection, or feature extraction.

17. The method of claim 13, wherein the folding protocol comprises a sequence of pivoting actions of the one or more folding panels as actuated by the actuating assembly.

18. The method of claim 17, wherein the folding protocol for pants comprises:
   actuating a left panel of the one or more folding panels; and
   actuating a right panel of the one or more folding panels.

19. The method of claim 17, wherein the folding protocol for shirts comprises:
   actuating a left panel of the one or more folding panels;
   actuating a right panel of the one or more folding panels; and
   actuating a bottom panel of the one or more folding panels.

20. The laundry folding appliance of claim 1, wherein a first panel of the one or more folding panels is rotatable about a first axis, a second panel of the one or more folding panels is rotatable about a second axis, and the first axis and the second axis are not parallel.

* * * * *